US012630237B2

(12) United States Patent
Köster

(10) Patent No.: US 12,630,237 B2
(45) Date of Patent: May 19, 2026

(54) FIFTH WHEEL, FIFTH WHEEL COUPLING SYSTEM, COMMERCIAL VEHICLE, AND COMMERCIAL VEHICLE COMBINATION

(71) Applicant: SAF-HOLLAND GmbH, Bessenbach (DE)

(72) Inventor: Mario Sebastian Köster, Bodman-Ludwigshafen (DE)

(73) Assignee: SAF-HOLLAND GmbH, Bessenbach (DE)

( * ) Notice: Subject to any disclaimer, the term of this patent is extended or adjusted under 35 U.S.C. 154(b) by 516 days.

(21) Appl. No.: 18/246,618

(22) PCT Filed: Jul. 29, 2022

(86) PCT No.: PCT/EP2022/071389

§ 371 (c)(1),
(2) Date: Mar. 24, 2023

(87) PCT Pub. No.: WO2023/012070

PCT Pub. Date: Feb. 9, 2023

(65) Prior Publication Data

US 2023/0406425 A1     Dec. 21, 2023

(30) Foreign Application Priority Data

Aug. 5, 2021    (DE) ..................... 10 2021 120 379.1

(51) Int. Cl.
*B62D 53/12*     (2006.01)
*B62D 53/08*     (2006.01)

(52) U.S. Cl.
CPC ....... *B62D 53/125* (2013.01); *B62D 53/0842* (2013.01)

(58) Field of Classification Search
CPC ......................... B62D 53/125; B62D 53/0842
See application file for complete search history.

(56) References Cited

U.S. PATENT DOCUMENTS

| | | | | |
|---|---|---|---|---|
| 8,066,298 B2 * | 11/2011 | Alguera | ............... | B62D 53/125 |
| | | | | 280/421 |
| 11,099,560 B2 * | 8/2021 | Smith | ...................... | G05D 1/81 |

(Continued)

FOREIGN PATENT DOCUMENTS

| | | |
|---|---|---|
| CA | 2434623 A1 | 1/2005 |
| CN | 101565060 B | 10/2012 |

(Continued)

OTHER PUBLICATIONS

European Patent Office; International Search Report; Nov. 21, 2022; Entire document.

*Primary Examiner* — Alentin Neacsu
*Assistant Examiner* — Marlon A Arce
(74) *Attorney, Agent, or Firm* — Price Heneveld LLP

(57) ABSTRACT

A fifth wheel includes a fifth wheel plate, a plug, a drive, and a guide arrangement for the plug, wherein the fifth wheel plate has a semi-trailer surface that has an outwardly pointing normal, that is parallel to a vertical direction wherein the fifth wheel plate has an insertion opening that extends in an insertion direction, wherein the plug is displaceable by the drive from a first, in particular retracted, position into a second position, in particular an extended position, wherein the plug is guided from the first position into the second position and/or from the second position into the first position by the guide arrangement, wherein an offset in the vertical direction and in the insertion direction is present between the first position and the second position.

22 Claims, 5 Drawing Sheets

(56) References Cited

U.S. PATENT DOCUMENTS

| | | | | |
|---|---|---|---|---|
| 12,084,131 | B2 * | 9/2024 | Köster | .................... B60D 1/015 |
| 12,194,797 | B2 * | 1/2025 | Köster | ................. B62D 53/125 |
| 2007/0114759 | A1 * | 5/2007 | Biondi | .............. B62D 53/0871 |
| | | | | 280/434 |
| 2011/0037241 | A1 * | 2/2011 | Temple | .................... B60D 1/64 |
| | | | | 280/421 |
| 2011/0092080 | A1 * | 4/2011 | Alguera | ................... B60D 1/64 |
| | | | | 439/35 |
| 2020/0001669 | A1 * | 1/2020 | Metternich | ............ B62D 53/08 |
| 2021/0039459 | A1 * | 2/2021 | Köster | .............. B62D 53/0885 |
| 2021/0061376 | A1 | 3/2021 | Moore et al. | |
| 2021/0284258 | A1 * | 9/2021 | Köster | ................. B62D 53/125 |

FOREIGN PATENT DOCUMENTS

| | | | | |
|---|---|---|---|---|
| CN | 210652564 | U | 6/2020 | |
| CN | 112672893 | A | 4/2021 | |
| CN | 112672894 | A | 4/2021 | |
| DE | 102006020069 | A1 | 11/2007 | |
| DE | 102018120470 | A1 | 2/2020 | |
| DE | 102019118836 | A1 | 1/2021 | |
| EP | 1655212 | A1 | 5/2006 | |
| EP | 3515797 | A0 | 7/2021 | |
| GB | 0618188 | | 10/2006 | |
| WO | 03039940 | A1 | 5/2003 | |
| WO | 2020200787 | A1 | 10/2020 | |
| WO | WO2020200787 | | * 10/2020 | ............. B60D 1/015 |

* cited by examiner

<u>Fig. 1</u>

FIFTH WHEEL, FIFTH WHEEL COUPLING SYSTEM, COMMERCIAL VEHICLE, AND COMMERCIAL VEHICLE COMBINATION

BACKGROUND

The invention relates to a fifth wheel, a fifth wheel coupling system, a commercial vehicle, and a commercial vehicle combination.

Fifth wheel coupling arrangements are already known. These are used for connecting a tractor to a trailer in a force-locked manner. In order to also be able to provide an energy connection or an information link between the tractor and the trailer, automatic coupling systems are already known, the automatic coupling systems including automatically connecting plugs of the tractor and of the trailer. These systems usually include a plug that is displaceable by means of a drive. The plug can only be displaced, however, in parallel or perpendicularly to a kingpin. As a result, however, specifically a nosing or pitching movement of the vehicles exerts high mechanical forces onto the plug connection and/or this movement is prevented or made difficult by the connected plugs.

The invention is therefore based on the object of providing a system for an energy and/or information transmission, which is quickly and easily connectable and does not obstruct or impede a pitching movement of the vehicles to be coupled.

SUMMARY

According to the invention, a fifth wheel is provided. Preferably, the fifth wheel includes a fifth wheel plate, a plug, a drive, and a guide arrangement for the plug, wherein the fifth wheel plate has a semi-trailer surface, wherein the semi-trailer surface has an outwardly pointing normal, wherein the outwardly pointing normal is at least substantially parallel to a vertical direction, wherein the fifth wheel plate has an insertion opening, wherein the insertion opening extends in an insertion direction, wherein the plug is displaceable by the drive from a first, in particular retracted, position into a second position, in particular an extended position, wherein the plug is guided from the first position into the second position and/or from the second position into the first position by the guide arrangement, wherein an offset in the vertical direction and in the insertion direction is present between the first position and the second position. The fifth wheel is configured for being arrangeable on a tractor. The fifth wheel is used for enabling a kingpin, or the like, of the towed vehicle or trailer to be received and for enabling the coupling thereto, allowing pulling forces to be transmitted between the fifth wheel and the kingpin and/or between the tractor and the attached vehicle or the towed vehicle. The fifth wheel includes a fifth wheel plate for this purpose. The fifth wheel plate has a semi-trailer surface. This semi-trailer surface is intended for use as the surface on which a semi-trailer or an attached vehicle can rest. In other words, the semi-trailer surface can be used for supporting a trailer or as a support surface for a trailer. The semi-trailer surface has an outwardly pointing normal. This outwardly pointing normal is directed in a vertical direction and/or in parallel or at least substantially in parallel to a vertical direction. "Substantially in parallel to" is to be understood to mean that the two relevant directions are permitted to form an angle with respect to each other that is a maximum of 10°, preferably a maximum of 5°, particularly preferably a maximum of 3°, and very particularly preferably a maximum of 1°. Alternatively, or additionally preferred, "substantially in parallel to" can also be understood to mean that the two relevant directions are parallel to each other within the scope of the usual tolerances, in particular the production tolerances. The fifth wheel plate has an insertion opening in particular. The insertion opening is the opening through which the kingpin is guided in order to be coupled in the fifth wheel plate. Advantageously, the insertion opening is designed in such a way that the insertion opening is arranged or formed between two horns of the fifth wheel plate. In a mounted state of the fifth wheel or of the fifth wheel plate at a tractor, the insertion direction can be at least substantially in parallel to a direction of travel in reverse and/or a forward direction of travel. The insertion direction is advantageously perpendicular to the vertical direction. A transverse direction is advantageously perpendicular to the plane that is spanned by the vertical direction and by the insertion direction. In other words, the vertical direction, the insertion direction, and the transverse direction can form a right-angled coordinate system with one another. In a mounted state or an idealized alignment state of the fifth wheel plate, the vertical direction can be directed at least substantially in parallel to the direction of the vector of the gravitational acceleration. The transverse direction, however, is the direction in particular that is oriented in parallel to a width direction of the tractor and/or of the towed vehicle. In other words, in a mounted state, the insertion direction can point forward and backward, the vertical direction can point upward and downward, and the transverse direction can point to the right and to the left. The plug of the fifth wheel according to the invention can be displaceable by the drive in particular from a first position into a second position and/or from the second position into the first position by the drive. In other words, the drive is therefore used for displacing and/or rotating the plug. The drive is advantageously arranged in a housing in order to protect the drive from external influences. This housing is advantageously arranged at the fifth wheel plate. Advantageously, the plug also has a housing. The housing of the plug and the housing of the drive are, advantageously, different housings. The first position can in particular also be referred to as a retracted position and the second position can in particular also be referred to as an extended position. In the retracted position, the plug is arranged or located in particular relative to the fifth wheel plate in such a way, in particular, that the plug is currently not in engagement or bringable into engagement with a complementary plug of a coupling partner, in particular of a fifth wheel partner. In the second position, or the extended position, the plug is configured, however, for becoming engaged in an information link or an energy connection with a complementary plug, in particular of the fifth wheel partner. In other words, the plug can be designed to be displaceable and/or rotatable by the drive from a position, in which a plug connection has not been established with the plug, into a position such that the plug is or can be brought into a plug connection with an appropriate complementary plug for the plug. For example, the plug of the fifth wheel is therefore not able to enter into a plug connection due to an approach by the partner to be coupled. Rather, the fifth wheel can enter into a plug connection only when the plug is displaced by the drive. Due to such a design, the security of the plug connection can in particular be increased and/or damage at the plug due to an unintentional approach and/or due to an excessively rapid approach by the partner to be coupled, in particular by the fifth wheel and by the kingpin, to the plug and to the complementary plug can be avoided. The plug is guided by the guide arrangement during the transfer from the first position into the second position and/or from the second position into the first position. "Guided" is to be understood in particular to mean that the spatial alignment and the position of the plug can be determined by the guide arrangement. In other words, the guide arrangement, which can be, for example, a guide rail, a guide rod, or a guide groove, therefore determines the instantaneous alignment and position of the plug during the transfer from the first position into the second position and/or from the second position into the first position. The fifth wheel is designed in such a way that an offset in a vertical direction and in the insertion direction is present between the first position and the second position. In other words, the plug of the fifth wheel is displaced or moved in a translatory manner between the first position and the second position in a vertical direction and also in an insertion direction. In addition, however, a rotation, in particular about the transverse direction, can also be carried out by the plug between the first and the second position. With respect to the offset or the determination of the offset, the relevant aspect is in particular the center of gravity of the plug relative to the center of gravity of the overall fifth wheel and/or of the fifth wheel plate. The offset in a vertical direction and/or in an insertion direction is in particular so great that the offset extends beyond the typical play and/or the positional tolerances. In other words, the offset in a vertical direction and/or in an insertion direction can therefore be at least 2 mm, preferably at least 10 mm, particularly preferably at least 4 cm and, in addition, particularly preferably at least 10 cm and, furthermore, particularly preferably at least 15 cm in a vertical direction and/or in the insertion direction. Due to the offset of the plug in a vertical direction and also in an insertion direction, it can be achieved that the plug also does not obstruct and/or only slightly obstructs the pitching movement of the fifth wheel relative to the fifth wheel partner to be coupled or to the fifth wheel partner in the inserted state, and so, as a result, the nosing or pitching movement of the vehicles exerts no or only slight mechanical forces onto the plug connection of the plug and/or onto the fifth wheel plate and/or the guide arrangement. In addition, due to such a design, a particularly installation space-saving and nevertheless secure coupling of the plug to the complementary plug for the plug can also be achieved.

Advantageously, the drive is an electric motor or a lifting cylinder. By means of an electric motor, a particularly simple power supply system and a displacement or transfer of the plug that is particularly well controllable by way of a closed-loop or open-loop system can be achieved. Advantageously, the electric motor can be a stepper motor, in order to achieve a simple and precise displacement of the plug. Due to the design of the drive as a lifting cylinder, in particular as a double-acting lifting cylinder, a particularly compact possibility for implementing the displacement of the plug can be achieved, allowing valuable installation space to be saved due to such an arrangement. The lifting cylinder or the double-acting lifting cylinder can be designed in particular as a hydraulic cylinder. Due to the provision of a hydraulic lifting cylinder, a particularly compact and nevertheless powerful displacement of the drive or plug can be realized. Alternatively or additionally preferred, the lifting cylinder can also be a pneumatic lifting cylinder. Due to the design of the lifting cylinder, in particular of the double-acting lifting cylinder, as a pneumatic cylinder, the environmental impact or the environmental degradation can be reduced and/or even prevented, in particular when leakages occur.

Advantageously, the guide arrangement is, in particular fixedly, connected to the fifth wheel plate and/or is fixed at the fifth wheel plate. Due to the connection of the guide arrangement at the fifth wheel plate and/or the, in particular stationary, fixation of the guide arrangement at the fifth wheel plate, a particularly secure possibility for the guidance and/or support and/or mounting of the guide arrangement can be created. In addition, due to such an arrangement, it can also be achieved that the guide arrangement is automatically guided along with the fifth wheel plate, in particular in the case of a rotating mounting of the fifth wheel plate, for example, about the transverse direction. A "connected state" is to be understood to mean that the guide arrangement is arranged indirectly or directly at the fifth wheel plate in such a way that the guide arrangement is supported at the fifth wheel plate in a force-locked manner. In other words, in a "connected state," the guide arrangement can therefore introduce its support forces exclusively into the fifth wheel. A "fixed state" is to be understood to mean that the guide arrangement is mechanically, in particular rigidly, connected to the fifth wheel plate and/or is directly connected or fastened to the fifth wheel plate. Such a fixation can be carried out, for example, by means of an integrally joined, force-locked, and/or form-locking fixation.

Advantageously, the guide arrangement is supported by means of a rubber mounting and/or wherein the guide arrangement has a coating that contains rubber. As a result, a compensation possibility can be created, enabling damage to be prevented and/or reduced when the plug is coupled to the complementarily formed plug element, in particular to the complementary plug for the plug. A rubber mounting is advantageously provided for the case in which an element is present in the power flow between the guide arrangement and the elements supporting the guide arrangement, the element being formed from rubber or containing rubber, wherein this rubber element or rubber-containing element performs an essential support function of the guide arrangement. An essential support function is given for the case in which in particular 15%, preferably 25%, particularly preferably 50%, and very particularly preferably 90% of the forces to be supported are guided in their power flow by the rubber element or the rubberized element. Advantageously, the rubber-containing coating on the guide arrangement is arranged at the areas that guide the plug. In other words, the guide surfaces of the guide arrangement can therefore be coated with a rubber-containing coating. Advantageously, at least 20%, preferably at least 50%, and particularly preferably 70%, in particular percent by volume or percent by weight, of the coating is formed from rubber.

Advantageously, the guide arrangement includes a guide rail or a guide rail arrangement. Due to the provision of a guide rail or a guide rail arrangement, a particularly good and secure guidance can be achieved, which can also be easily serviced and/or cleaned. Alternatively or additionally preferred, the guide arrangement can also include a guide groove or a guide groove arrangement. The advantage of a guide groove arrangement is that the risk of injury in particular can be reduced due to the guide groove arrangement.

In one advantageous embodiment, the guide arrangement, in particular the guide rail or the guide rail arrangement, is partially, preferably completely, formed from sheet metal. Due to the use of sheet metal for forming the guide rail or the guide rail arrangement, a particularly cost-effective and simple manufacture can be achieved. In addition, due to the use of sheet metal, it can also be achieved that the guide arrangement in itself has a certain elasticity and compensation possibility in order to thereby prevent damage to the plug and to the complementary plug element or to the complementary plug, in particular when certain tolerances must be compensated for during insertion.

Advantageously, the plug includes a guiding device, wherein the plug is guided at the guide arrangement via the guiding device. In other words, the plug can include elements and/or a device, with which the plug is guided, in particular in a form-locking manner, in engagement with the guide arrangement. Due to such a design of the plug, a particularly good support possibility of the plug can be achieved due to the direct support and due to the direct guidance of the plug at the guide arrangement via the guiding device.

Advantageously, the guiding device includes at least one, preferably at least three, support element(s). These support elements are used for supporting the plug with respect to the guide arrangement. The support elements can be, for example, projections or pins. Due to the provision of support elements, a particularly compact and secure support can be implemented.

This support, in particular by means of the support elements, can take place in such a way that the plug has play, in particular in a vertical direction, with respect to the guide arrangement. In other words, the plug can have, for example, at least 1 mm, preferably at least 2 mm, particularly preferably at least 3 mm, and very particularly preferably at least 4 mm play in a vertical direction with respect to the guide arrangement. Alternatively or additionally preferred, the plug can also be guided at the guide arrangement, in particular by the guiding device, in such a way that the plug has tilting play, wherein this tilting play can in particular be rotatory play about the transverse axis.

Advantageously, the fifth wheel is designed in such a way that at least three support areas exist, by means of which the plug rests or can rest at the guide arrangement. Advantageously, these support areas are formed by the support elements.

Advantageously, the plug therefore, in other words, has at least three support surfaces, wherein the plug can have play with respect to the guide arrangement, in particular in a vertical direction, wherein the plug can tilt with respect to the guide arrangement, in particular in a rotatory manner about the transverse direction.

Advantageously, at least one support element is arranged in a vertical direction on the one side of the guide arrangement and at least one further support element is arranged in a vertical direction on the other side of the guide arrangement. This enables a particularly secure guidance of the plug to take place.

Advantageously, the guiding device is designed in such a way that the guiding device has rolling elements. These rolling elements can also be referred to as roller elements. The rolling elements are, in particular, balls or other elements, which roll on the guide arrangement during the displacement of the plug from the first position into the second position. Due to this rolling movement, the friction between the guiding device and the guide arrangement can in particular be reduced, enabling energy losses to be reduced, and so the drive can be dimensioned smaller in particular.

Advantageously, the plug, in particular the guiding device, has at least one, preferably at least three, roller(s). Due to the use of rollers or of a roller, friction can be reduced, wherein, however, a low surface contact pressure is simultaneously achieved, and so a long-life and mechanically secure support of the plug with respect to the guide arrangement can be achieved. Advantageously, the rollers are formed or arranged at the plug and, in particular, are part of the guiding device of the plug. As a result, a particularly compact and simple design of the plug and of the guiding device of the plug can be achieved.

Advantageously, at least one roller, preferably all rollers, has/have a running surface or is/are formed predominantly from rubber. Due to the fact that the running surface of the roller is formed from rubber or is predominantly formed from rubber, it can be achieved that the rollers themselves can provide a certain compensatory movement, enabling mechanical damage to the plug element during the plugging, or the insertion or unplugging, of the plug to be reduced. The running surface of the rollers are, in particular, the outer circumferential surfaces of the rollers and/or the surfaces, by means of which the roller contacts the guide arrangement, in particular thereby contacts the guide surfaces of the guide arrangement.

Advantageously, the fifth wheel has two guide arrangements, wherein these two guide arrangements are both engaged with the plug, in particular each guide arrangement being engaged with one guiding device of the plug. Due to the provision of two guide arrangements and/or two guiding devices, which are distanced from each other in a transverse direction in particular, a particularly secure guidance can be achieved. Advantageously, the guiding device, the guide arrangement, and/or the plug can be designed in such a way that the features, embodiments, and advantages described above with respect to the plug, the guiding device, and the guide arrangement can each be realized in one and/or in both of these guiding devices and guide arrangements. Advantageously, the guide arrangements and the guiding devices are spaced apart from one another by at least 5 cm in a transverse direction, particularly preferably at least 10 cm in a transverse direction. Advantageously, the guiding device and/or the guide arrangements are formed congruently to one another in a transverse direction. "Congruently" is to be understood to mean that the projection of the guide arrangement and/or of the guiding device on a plane that is perpendicular to the transverse direction and/or is formed through the insertion direction and through the vertical direction are congruent to one another. In other words, the guiding device, the guide arrangement, and/or the plug can therefore be identically designed on the right and the left.

Advantageously, the plug has a connecting area, wherein the plug is connected to the drive via the connecting area, wherein the connecting area is formed in particular by an oblong hole. The connecting area of the plug is used for receiving forces and/or torques from the drive, in order to thereby achieve the displacement or the transfer of the plug between the first position and the second position and/or from the second position into the first position. The connecting area can in particular form a distal area of the plug in an insertion direction. Advantageously, the connecting area is located, in a transverse direction, in the center or in a central area of the plug. In order to achieve a particularly easily manufactured and nevertheless secure transfer of the plug, the connecting area should be formed by an oblong hole and/or have an oblong hole. This oblong hole is connected to the drive in particular via a bolted, screw, or rivet connection.

Preferably, the fifth wheel includes a clamping device and/or a stop, wherein the clamping device and/or the stop can fix and/or hold the plug in a vertical direction and/or in the insertion direction in the first position. Due to the provision of a clamping device and/or a stop, which can fix and/or hold the plug in a vertical direction and/or in the insertion direction in the first position, an unintentional displacement during the driving operation of the fifth wheel can be avoided and/or reduced. In addition, the vibration load of the plug can also be reduced due to such an arrangement, enabling the service life of the plug to be increased.

Advantageously, the plug includes at least one guide prong, preferably two guide prongs, and/or a guide element or guide surfaces, wherein the guide prong and/or the guide prongs can form, in an insertion direction, a distal end area of the plug, and/or wherein the guide prongs can be distanced from one another in a transverse direction. Due to the guide prongs, a fine positioning of the plug can be achieved, in particular shortly before the plug enters into plug contact with the complementary plug. Advantageously, the complementary plug therefore has female guide elements in order to thereby be able to guide and receive the guide prong. The guide elements or guide surfaces can be structures or formations that are to align or guide the plug during insertion into the complementary plug. Advantageously, the guide prong can be an example of a guide element.

Preferably, the guide arrangement has a gradient angle in particular in a range from 0° to 25°, preferably in a range from 0° to 20°, and particularly preferably in a range from 0° to 16°. A gradient angle is to be understood as the local angle of the projection of the guide surfaces or of the guiding elements of the guide arrangement with the insertion direction. The projection takes place onto a plane that is spanned by the vertical direction and the insertion direction. The relevant angle, however, is always the smaller angle that the projection of the guide surfaces of the guide arrangement or the guide elements of the guide arrangement form with the insertion direction. At a gradient angle in the range from 0° to 25°, a particularly cost-effective and simple production of the guide arrangement can be achieved. At a gradient angle in the range from 0° to 20°, a particularly compact and installation space-saving guide arrangement can be realized. Should the gradient angle remain in a range between 0° and 16°, a particularly good possibility can be achieved for enduring pitching movements of the vehicle, in particular relative to the towed vehicle, and a typical pitching movement generates particularly low loads on the plug, in particular in an inserted state of the plug.

Advantageously, the guide arrangement has a maximum gradient angle, wherein the maximum gradient angle is in particular in a range from 5° to 25°, preferably in a range from 10° to 20°, and particularly preferably in a range from 12° to 16°. The maximum gradient angle of the guide arrangement is the largest possible gradient angle of the guide arrangement. This gradient angle must be greater than 0°; otherwise this gradient angle can in particular not be considered to be a maximum gradient angle. The relevant aspect, however, is in particular only the area of the guide arrangement that contacts the plug during the displacement of the plug from the first position into the second position and/or from the second position into the first position. At a maximum gradient angle in a range from 5° to 25°, a particularly cost-effective and simple production of the guide arrangement can be achieved. At a maximum gradient angle in the range from 10° to 20°, a particularly compact and installation space-saving guide arrangement results. Should the maximum gradient angle be situated in a range from 12° to 16°, a particularly low obstruction of the pitch angle movement can be achieved as a result.

Advantageously, the guide arrangement has a variable gradient angle. A variable gradient angle is to be understood to mean that the gradient angle is variable or varied along the guide arrangement. Due to the gradual change in the gradient angle, a gradual pivot or displacement of the plug element can be achieved, and so only low acceleration forces act upon the plug also when the plug is quickly displaced, enabling the service life of the plug to be increased and/or the mechanical loads on the plug to be reduced.

Advantageously, the guide arrangement includes a section, preferably a plurality of sections, which is equipped with constant gradient angles. In other words, the guide arrangement can include sections having constant gradient angles. Due to the design of the guide arrangement having constant gradient angles, a particularly simple production of the guide arrangement can be achieved.

Advantageously, the guide arrangement has along its profile an, in particular monotonously, increasing profile in the vertical direction and/or an, in particular monotonously, increasing gradient angle. The profile of the guide arrangement is determined in particular from the first position into the second position. Advantageously, the predominant profile of the guide arrangement is formed with an increasing profile in the vertical direction and/or with an increasing gradient angle. In other words, at least 50%, preferably at least 70%, of the profile of the guide arrangement is formed so as to be increasing in the vertical direction. As a result, a particularly simple and fast as well as low-acceleration displacement or transfer of the plug in the vertical direction can take place. Due to a monotonously increasing profile of the guide arrangement in the vertical direction and/or the monotonously increasing gradient angle, in particular along the profile of the guide arrangement, a particularly low acceleration onto the plug during the displacement from the first position into the second position and/or from the second position into the first position along the guide arrangement can be achieved. In other words, due to a monotonously increasing profile in a vertical direction and/or a monotonously increasing gradient angle, in particular along the profile of the guide arrangement, a particularly deflection-free transfer from the first position into the second position and/or from the second position into the first position can be achieved. Moreover, due to such a design of the guide arrangement, a particularly cost-effective design can also be achieved.

Advantageously, the plug has a cover, wherein the cover is passive in particular. The cover of the plug is used for covering the plug elements and/or the information and/or energy line contacts of the plug with respect to external influences. In other words, the plug can have a cover, which, in the covered position, prevents elements from being plugged into the plug connections and/or the plug elements of the plug and, in an uncovered position, permits elements to be plugged into or with the plug. Due to the provision of a cover, the environmental influences upon the plug can therefore be reduced, enabling the durability of the plug to be increased. Advantageously, the cover is designed to be passive. A "passive cover" can in particular be understood to mean that the cover is pushed on or displaced due to the cover directly or indirectly coming into contact with the complementary plug and/or the plug coming into contact with the complementary plug. In other words, in a passive design, the cover can therefore not be pushed on directly by the drive. Due to this merely indirect actuation or displacement of the cover, a particularly compact and secure covering can take place. This is the case because the cover, then, is displaced only when a complementary plug for the plug is actually present. Alternatively preferred, the cover can also be active. An "active cover" can in particular be understood to mean that the cover is displaced directly by the drive.

A further aspect of the invention can relate to a fifth wheel coupling system, which includes in particular a fifth wheel as described above and in the following, and a fifth wheel coupling partner. The fifth wheel coupling partner is the coupling partner that is configured for being or becoming coupled to the fifth wheel. The fifth wheel coupling partner includes in particular a kingpin, wherein the kingpin extends in a kingpin direction, wherein the kingpin direction is at least substantially parallel to the vertical direction, in particular in a coupled state, wherein an extension arm is arranged at the fifth wheel coupling partner so as to be pivotable about the kingpin, wherein a complementary plug is arranged at the extension arm, wherein the complementary plug is configured for being insertable into a plug connection with the plug of the fifth wheel. The fifth wheel coupling partner can in particular be part of a semi-trailer and/or a separate element or a separate assembly, which can be mounted at a semi-trailer. The fifth wheel coupling partner includes in particular a kingpin, wherein the kingpin advantageously extends in a kingpin direction, wherein the outer circumferential surfaces of the kingpin are advantageously formed rotation-symmetrically about the kingpin direction. Advantageously, the kingpin direction can be oriented in parallel to the vertical direction and/or in parallel to the outwardly pointing normal of the semi-trailer surface, at least in a coupled state. An extension arm in particular is mounted at the fifth wheel coupling partner so as to be capable of rotating about the kingpin, in particular about the kingpin in the kingpin direction. In other words, the fifth wheel coupling partner can also include an extension arm, which is mounted so as to be pivotable about the kingpin, in particular about the kingpin direction. A complementary plug is arranged or mounted at the extension arm, wherein the complementary plug is designed to be complementary to the plug, enabling the plug and the complementary plug to establish an energy-conducting connection and/or an information link, in particular in an inserted state. In other words, the complementary plug can therefore enter into a plug connection with the plug of the fifth wheel. Due to the rotatory mounting of the extension arm, in particular so as to be capable of rotating about the kingpin direction, a particularly simple alignment of the extension arm can be carried out. Alternatively or additionally preferred, the complementary plug can also be mounted at the extension arm in a rotatory manner, wherein this rotation direction, in a coupled state, is oriented in particular at least essentially in parallel to the transverse direction, preferably in parallel to the transverse direction.

Advantageously, the complementary plug, in an inserted state, has an angle with the vertical direction and the insertion direction that is not equal to 0° and not equal to 90°. The direction that the complementary plug takes is in particular the direction that a plug must take in order to be pluggable into the complementary plug. In other words, the direction of the complementary plug is therefore the direction that an imaginary plug must take in order to be insertable into the plug, in order to thereby be able to establish an energy connection and/or an information link between the complementary plug and the imaginary plug. Due to the design of the direction to not be equal to 0° and to not be equal to 90°, a particularly compact and simple connection of the complementary plug with the plug can be achieved and, in addition, a particularly good resistance to pitching and nosing movements between the tractor and the towed vehicle or the fifth wheel and the fifth wheel coupling partner can be achieved.

In one preferred embodiment and advantageously, the complementary plug includes a cap, wherein the cap is passive in particular. Due to the passive design of the cap of the complementary plug, a particularly energy-saving and secure concealment of the complementary plug can be achieved. The cap of the complementary plug is used, similarly to the cover of the plug, for keeping environmental influences away from the sensitive integral parts of the complementary plug, in particular from the energy-conducting contacts and/or the information-conveying contacts of the complementary plug.

Advantageously, the extension arm is mirror symmetrical with respect to a plane. A cost-effective manufacture of the extension arm can therefore be achieved. Advantageously, the plane of symmetry, in particular in a coupled state, is congruent to the plane that is spanned by the vertical direction and the insertion direction.

Advantageously, the extension arm has two limbs, wherein the complementary plug can be arranged in particular between the limbs and/or at the limbs. Due to the provision of two limbs at the extension arm or in the extension arm, a particularly cost-effective and lightweight structure can be achieved. In addition, due to the fixation and the arrangement of the complementary plug at the limbs, a compact and nevertheless mechanically secure support of the complementary plug can be achieved. Should the plug be arranged between the limbs of the complementary plug, the limbs can form a certain mechanical protection for the complementary plug, enabling the operational reliability of the fifth wheel coupling system to be increased.

Advantageously, the limbs are arranged in the shape of a V with respect to each other, at least in sections. In other words, the limbs can extend toward one another in the shape of an arrow. Advantageously, this V-shaped direction or the arrow direction points toward the kingpin. Due to such a design, the insertion opening of the fifth wheel plate can therefore be utilized for using an alignment of the extension arm or the limbs to achieve a secure coupling or plugging of the plug with the complementary plug.

One further aspect of the invention can relate to a commercial vehicle, in particular a tractor, wherein this commercial vehicle can include a fifth wheel in particular, as described above and in the following.

One further aspect of the invention can relate to a commercial vehicle arrangement including a commercial vehicle as described above and a further commercial vehicle, which is a commercial vehicle trailer in particular. A fifth wheel in particular is mounted at the first commercial vehicle as described above and in the following and/or the commercial vehicle includes such a fifth wheel and/or wherein the further commercial vehicle, which is a commercial vehicle trailer in particular, can include or form the fifth wheel coupling partner, as described above and in the following. In other words, a fifth wheel coupling system can be provided as described above and in the following in the commercial vehicle arrangement and/or mounted at each of the commercial vehicles. Advantageously, the commercial vehicle trailer is a semi-trailer.

BRIEF DESCRIPTION OF THE DRAWINGS

Further advantages and features of the present invention can be gathered from the following description with reference to the figures. Individual features disclosed in the

11

Figure 1:
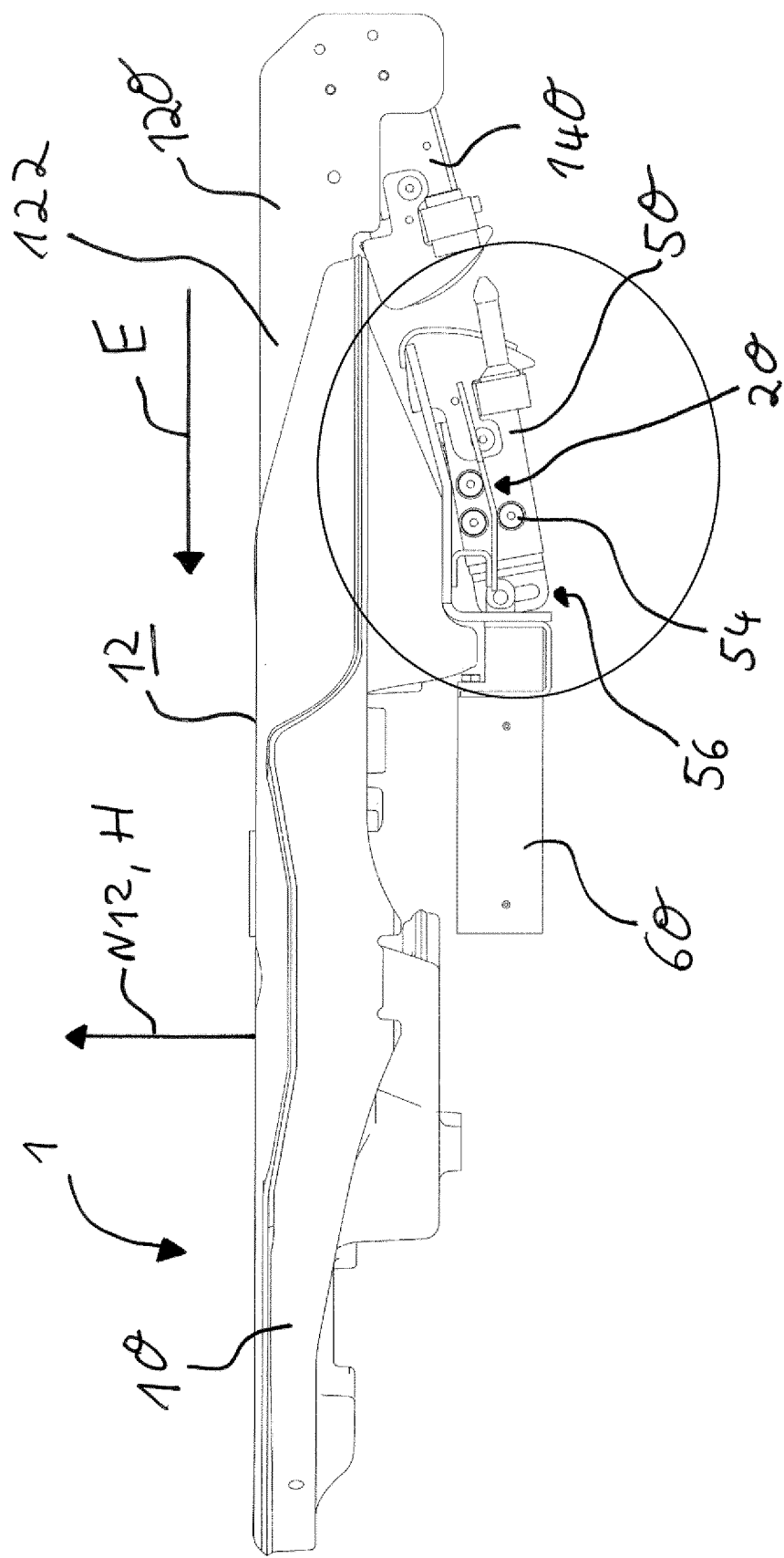
Figure 2:
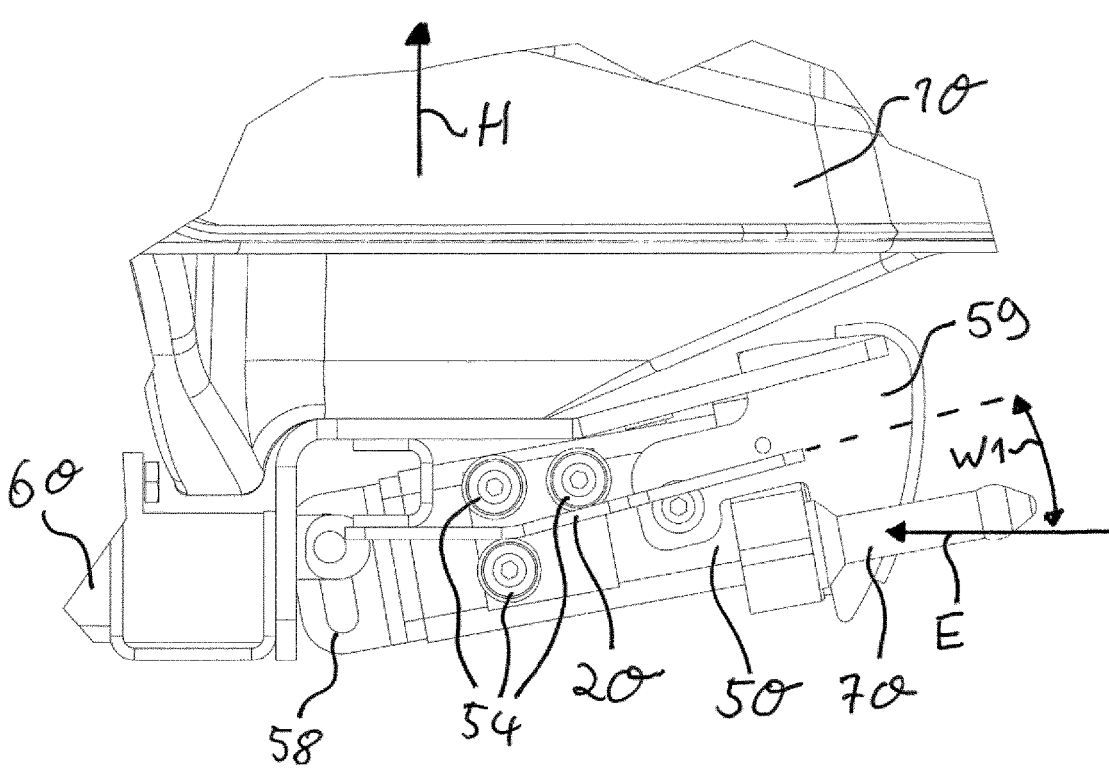
Figure 3:
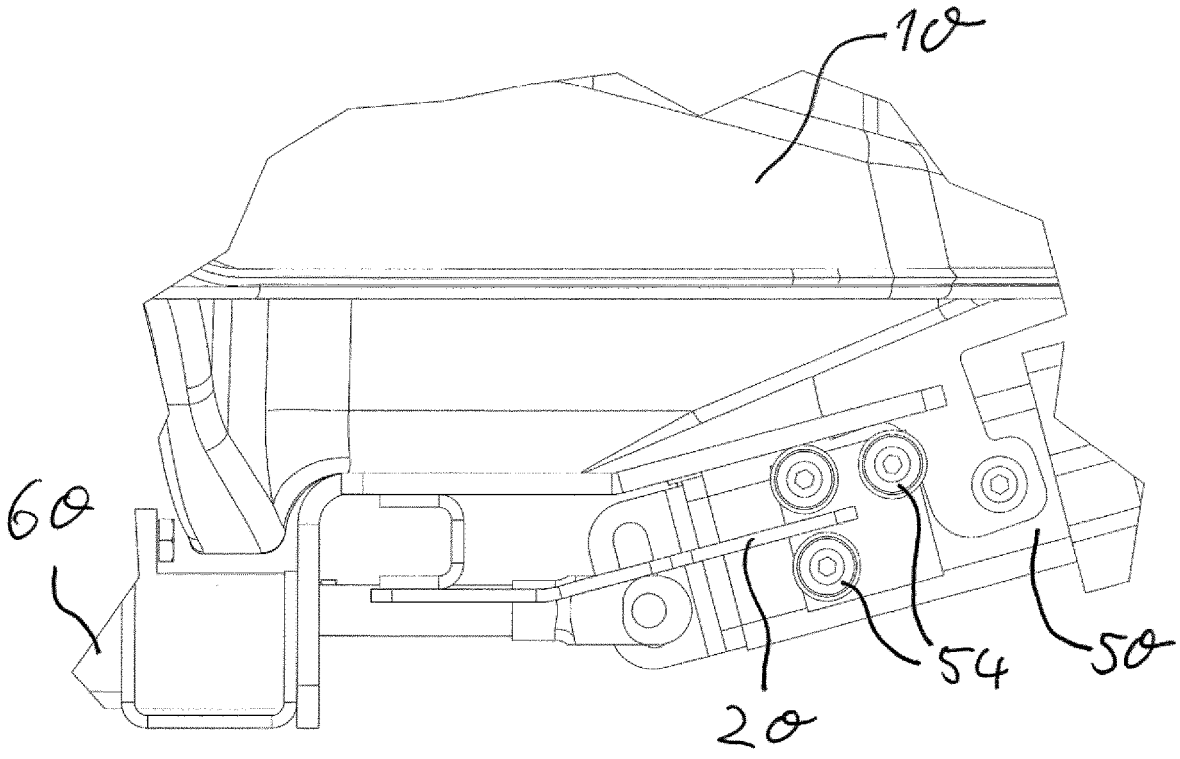
Figure 4:
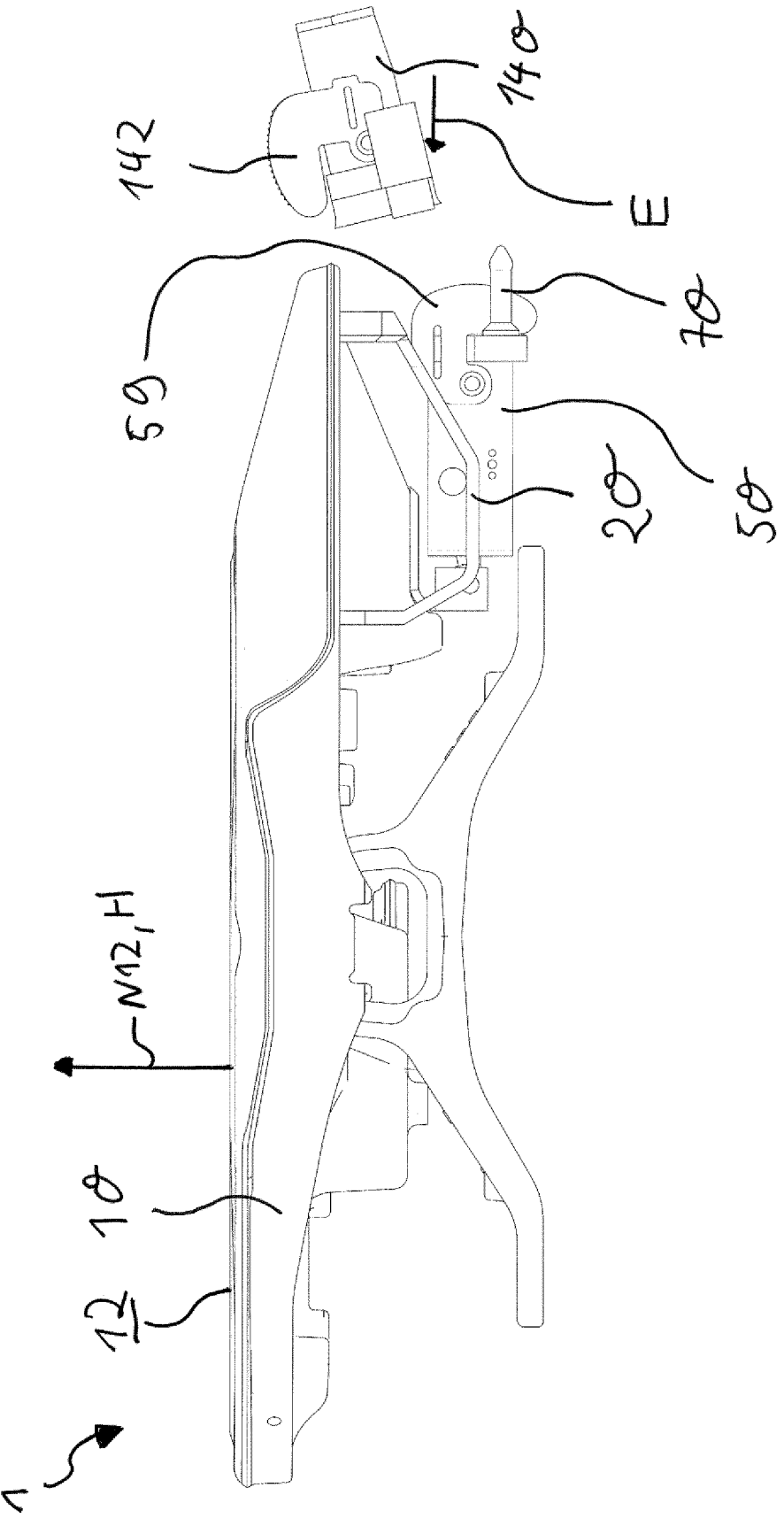
Figure 5:
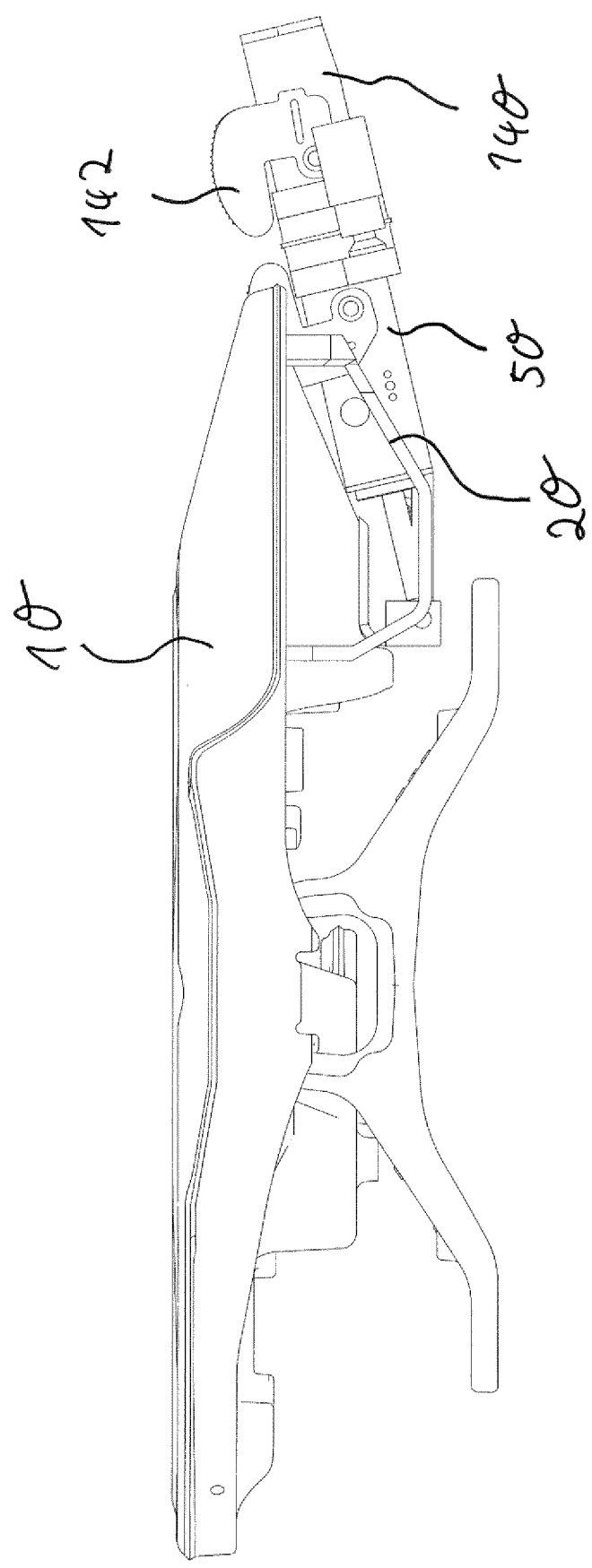
Figure 6:
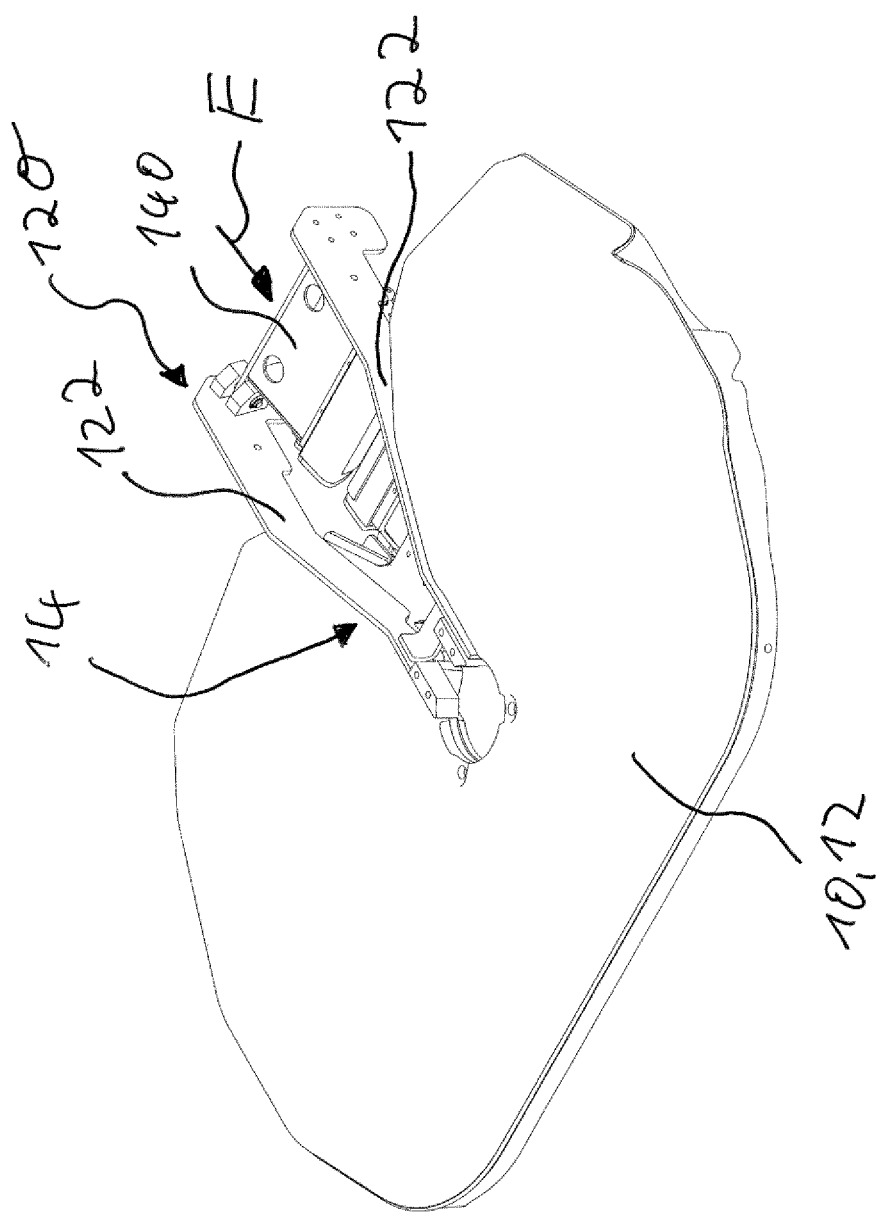

12 embodiments shown can also be used in other embodiments, provided this has not been expressly ruled out. In the drawings:

FIG. 1 shows a side elevation view of a fifth wheel;

FIGS. 2 and 3 show side elevation views of sections from a fifth wheel;

FIG. 4 shows an exploded side elevation view of a fifth wheel and a fifth wheel coupling system;

FIG. 5 shows a side elevation view of a further embodiment of a fifth wheel coupling system; and FIG. 6 shows a perspective view of a fifth wheel plate and of an extension arm.

DETAILED DESCRIPTION

A fifth wheel 1 is shown in FIG. 1. The fifth wheel 1 includes a fifth wheel plate 10, which forms a semi-trailer surface 12. The semi-trailer surface 12 has an outwardly pointing normal N12. This outwardly pointing normal N12 is parallel to the vertical direction H. The vertical direction H is perpendicular to the insertion direction E. The transverse direction is not shown in FIG. 1, the transverse direction being perpendicular to the insertion direction E and/or perpendicular to the vertical direction H. The insertion direction E is in particular the direction that a kingpin must take in order to be inserted into the insertion openings 14 (not visible in FIG. 1) of the fifth wheel plate 10 into the coupling position. The guide arrangement 20 is fixed at the fifth wheel plate 10. The plug 50 is guided by the guide arrangement 20, in particular via the rollers 54. The guide arrangement 20 is formed as a guide rail arrangement. In order to displace the plug 50 from the first position into the second position, the fifth wheel 1 has a drive 60, which is fixed at the plug 50 via the connecting area 56 of the plug 50. The plug 50 is used, in particular in the second position, for entering into a plug connection with the complementary plug 140. The plug 50 is mounted at the extension arm 120, wherein the complementary plug 140 is located at least in sections between the limbs 122 of the extension arm 120.

FIG. 2 shows a detailed view of a fifth wheel 1. In particular, the detail area shown in FIG. 2 can correspond to the area marked with the circle in FIG. 1. As is apparent in FIG. 2, the plug 50 has, in its connecting area 56, an oblong hole 58, by means of which the plug 50 can receive forces from the drive 60. The plug 50 is guided at the guide arrangement 20 via a guiding device. The guiding device includes at least three rollers 54, each of which has a running surface formed from rubber. The rollers 54 are used for supporting the plug 50 with respect to the guide arrangement 20. The guide arrangement 20 has two gradient angles W1. In the position shown in FIG. 2, the plug 50 is in the first position, and so the plug 50 is unable or not intended to enter into a plug connection with a complementary plug in this position. The plug 50 includes a cover 59 and laterally arranged guide prongs 70.

FIG. 3 also shows a detailed view of a fifth wheel 1, wherein the fifth wheel 1 is in the second position and the plug 50 of the fifth wheel 1 is in the second position. In other words, the situation represented in FIG. 3 can correspond to an inserted plug. As is apparent from the comparison of FIGS. 2 and 3, the plug 50 has been displaced from the first position into the second position in the vertical direction H and also in the insertion direction E. In principle, the situation represented in FIG. 3 can go along with the situation in FIG. 2 and/or the detail area from FIG. 1.

FIG. 4 shows a further embodiment of a fifth wheel 1 according to the invention. The fifth wheel 1 also includes a fifth wheel plate 10, a plug 50, a drive 60, and a guide arrangement 20. The guide arrangement 20 is fixedly connected to the fifth wheel plate 10 and is fixed at the fifth wheel plate 10. The guide arrangement 20 can be made at least partially from sheet metal. The plug 50 also includes a cover 59, which is configured for being able to displace the cap 142 of the complementary plug 140. In FIG. 4, the plug and the fifth wheel 1 are in the first position.

FIG. 5 shows one further embodiment of a fifth wheel 1, which, in principle, can go along with the embodiments shown in FIG. 4, wherein, in FIG. 5, however, the plug 50 is in the second position, which in particular can also be referred to as an inserted position or as a plugged position.

FIG. 6 shows an isometric view of a fifth wheel plate 10 of a fifth wheel 1, wherein the extension arm 120 of the fifth wheel coupling partner is located in the insertion opening 14 of the fifth wheel plate 10. The insertion opening 14 extends in an insertion direction E. The extension arm 120 has two limbs 122, which are designed in the shape of a V with respect to each other in one section. The complementary plug 140 is located between the limbs 122 and is rotatorally mounted at the limbs 122.

LIST OF REFERENCE SIGNS

1—fifth wheel
10—fifth wheel plate
12—semi-trailer surface
14—insertion opening
20—guide arrangement
50—plug
54—roller
56—connecting area
58—oblong hole
59—cover
60—drive
70—guide prong
120—extension arm
122—limb
140—complementary plug
142—cap
E—insertion direction
H—vertical direction
N12—outwardly pointing normal of the semi-trailer surface
W1—gradient angle

The invention claimed is:

1. A fifth wheel, comprising:

a fifth wheel plate including a semi-trailer surface and an insertion opening, wherein the semi-trailer surface has an outwardly pointing normal that is substantially parallel to a vertical direction and wherein the insertion opening extends in an insertion direction;

a drive;

a plug displaceable from a retracted first position into an extended second position by the drive; and a guide arrangement, wherein the plug is guided by the guide arrangement from the first position into the second position and/or from the second position into the first position;

wherein an offset in the vertical direction and in the insertion direction is present between the first position and the second position; and wherein the guide arrangement includes a guide rail arrangement along which the plug is guided.

2. The fifth wheel as claimed in claim 1, wherein the drive comprises an electric motor or a lifting cylinder.

3. The fifth wheel as claimed in claim 1, wherein the guide arrangement is fixedly connected to the fifth wheel plate and/or is fixed at the fifth wheel plate.

4. The fifth wheel as claimed in claim 1, wherein the plug includes a guiding device, and wherein the plug is guided at the guide arrangement via the guiding device.

5. The fifth wheel as claimed in claim 4, wherein the guiding device includes at least one support element, and wherein the support element includes a roller element.

6. The fifth wheel as claimed in claim 5, wherein the at least one support element includes at least three roller elements.

7. The fifth wheel of claim 1, further comprising:

a clamping device and/or a stop, wherein the clamping device and/or the stop is configured to fix and/or hold the plug in the vertical direction and/or in the insertion direction in the first position.

8. The fifth wheel as claimed in claim 1, wherein the plug has at least one guide prong, wherein the guide prong forms a distal end area of the plug in the insertion direction.

9. The fifth wheel as claimed in claim 1, wherein the guide arrangement has a gradient angle in a range from 0° to 25°.

10. The fifth wheel of claim 9, wherein the range of the gradient angle is from 0° to 20°.

11. The fifth wheel of claim 10, wherein the range of the gradient angle is from 0° to 16°.

12. The fifth wheel as claimed in claim 1, wherein the plug has a cover.

13. A fifth wheel coupling system, comprising:

the fifth wheel as claimed in claim 1; and a fifth wheel coupling partner comprising:

a kingpin extending in a kingpin direction that is substantially parallel to the vertical direction in a coupled state;

an extension arm arranged at the fifth wheel coupling partner so as to be pivotable about the kingpin;

a complementary plug arranged at the extension arm, and configured to be insertable into a plug connection with the plug of the fifth wheel.

14. A commercial vehicle arrangement, comprising:

a tractor that includes the fifth wheel as claimed in claim 1.

15. The commercial vehicle arrangement of claim 14, further comprising:

one further commercial vehicle that includes a commercial vehicle trailer; and the fifth wheel coupling system as claimed in claim 13.

16. A fifth wheel, comprising:

a fifth wheel plate including a semi-trailer surface and an insertion opening, wherein the semi-trailer surface has an outwardly pointing normal that is substantially parallel to a vertical direction and wherein the insertion opening extends in an insertion direction;

a drive;

a plug displaceable from a retracted first position into an extended second position by the drive; and a guide arrangement, wherein the plug is guided by the guide arrangement from the first position into the second position and/or from the second position into the first position;

wherein an offset in the vertical direction and in the insertion direction is present between the first position and the second position; and wherein the plug has a connecting area, wherein the plug is connected to the drive via the connecting area, and wherein the connecting area includes an oblong hole.

17. A fifth wheel, comprising:

a fifth wheel plate including a semi-trailer surface and an insertion opening configured to receive a kingpin therein, wherein the semi-trailer surface has an outwardly pointing normal that is substantially parallel to a vertical direction;

a plug configured to move in an insertion direction between an uninserted position where the plug is spaced from a complimentary plug and an inserted position where the plug is inserted into the complimentary plug;

a drive configured to displace the plug along a guide path from a first position to a second position and move the plug from the uninserted position to the inserted position; and a guide arrangement configured to guide the plug along the guide path as the plug is displaced between the first and second positions;

wherein a gradient angle between the insertion direction and the guide path is between about 0° and about 25°; and wherein the guide arrangement includes a guide rail arrangement along which the plug is guided.

18. The fifth wheel as defined in claim 17, wherein the insertion direction is substantially parallel with the semi-trailer surface.

19. The fifth wheel as defined in claim 17, wherein the gradient angle is between about 0° and about 20°.

20. The fifth wheel as defined in claim 19, wherein the gradient angle is between about 0° and about 10°.

21. The fifth wheel as defined in claim 17, wherein the first position includes a retracted position and the second position includes an extended position.

22. A fifth wheel coupling system, comprising:

the fifth wheel as defined in claim 17; and a fifth wheel coupling partner, comprising:

the kingpin, wherein the kingpin extends in a direction that is substantially parallel with the vertical direction when the kingpin is received within the insertion opening;

an extension arm pivotable about the kingpin; and the complementary plug, wherein the complementary plug is arranged on the extension arm.

* * * * *